(12) United States Patent
Lee et al.

(10) Patent No.: US 7,540,004 B2
(45) Date of Patent: May 26, 2009

(54) ULTRA-SMALL OPTICAL/MAGNETIC HEAD ACTUATOR WITH PIVOT HINGE AND HALBACH MAGNET ARRAY

(75) Inventors: Sung Q Lee, Daejeon (KR); Kang Ho Park, Daejeon (KR); Mun Cheol Paek, Daejeon (KR); Kwang Yong Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 778 days.

(21) Appl. No.: 11/270,161

(22) Filed: Nov. 9, 2005

(65) Prior Publication Data

US 2006/0123437 A1 Jun. 8, 2006

(30) Foreign Application Priority Data

Dec. 8, 2004 (KR) .................. 10-2004-0103074
Aug. 12, 2005 (KR) .................. 10-2005-0074440

(51) Int. Cl.
  *G11B 21/02* (2006.01)
  *G11B 7/09* (2006.01)
(52) U.S. Cl. ............. 720/662; 360/265.2; 360/294.7; 720/683
(58) Field of Classification Search ............. 720/662, 720/683; 360/265.2, 265.6, 294.7
See application file for complete search history.

(56) References Cited

U.S. PATENT DOCUMENTS

| | | | | |
|---|---|---|---|---|
| 3,360,266 A | * | 12/1967 | Ormond | ............ 267/154 |
| 3,909,077 A | * | 9/1975 | Leonarduzzi | ............ 403/291 |
| 4,405,184 A | * | 9/1983 | Bahiman | ............ 403/291 |
| 5,050,964 A | * | 9/1991 | Mori | ............ 359/813 |
| 5,202,804 A | * | 4/1993 | Takekado | ............ 360/264.7 |
| 5,432,663 A | * | 7/1995 | Ichihara | ............ 360/264.7 |
| 5,504,641 A | * | 4/1996 | Diel | ............ 360/264.7 |
| 5,559,652 A | * | 9/1996 | Heath et al. | ............ 360/265.2 |
| 5,675,452 A | * | 10/1997 | Nigam | ............ 360/97.02 |
| 5,761,006 A | * | 6/1998 | Sri-Jayantha et al. | ............ 360/265.2 |
| 6,205,005 B1 | * | 3/2001 | Heath | ............ 360/266.1 |
| 6,404,727 B1 | * | 6/2002 | Rao | ............ 720/666 |
| 6,424,503 B1 | * | 7/2002 | Chin et al. | ............ 360/265.2 |
| 6,442,000 B1 | * | 8/2002 | Koong et al. | ............ 360/256.4 |
| 6,768,601 B2 | | 7/2004 | Ju | |
| 6,963,472 B2 | * | 11/2005 | He et al. | ............ 360/265.7 |
| 7,031,116 B2 | * | 4/2006 | Subrahmanyan | ............ 360/264.7 |
| 2002/0181140 A1 | * | 12/2002 | Subrahmanyan | ............ 360/75 |
| 2003/0044096 A1 | | 3/2003 | Koyama et al. | |
| 2003/0099067 A1 | * | 5/2003 | Farahat | ............ 360/264.3 |
| 2008/0165451 A1 | * | 7/2008 | Binnard et al. | ............ 360/264.7 |

\* cited by examiner

*Primary Examiner*—William J Klimowicz
(74) *Attorney, Agent, or Firm*—Ladas & Parry LLP (57) ABSTRACT

An ultra-small optical/magnetic head actuator includes: a swing arm movable in a horizontal direction (tracking direction) and a vertical direction (focusing direction) and having mounted thereon a head for reading and writing information on a disk. A tracking actuator moves the swing arm in the horizontal direction (tracking direction) and a pivot hinge adjusts a radius of rotation of the swing arm and guides the movement of the swing arm in the tracking direction. A focusing actuator moves the swing arm in the vertical direction (focusing direction), wherein the focusing actuator includes a focusing coil attached under the swing arm and a Halbach magnet array disposed under the focusing coil minimizes thickness. Friction or backlash can be avoided, and non-repetitive errors can be reduced. The thickness of the ultra-small storage device can be reduced due to the use of a Halbach magnet array.

21 Claims, 9 Drawing Sheets

ULTRA-SMALL OPTICAL/MAGNETIC HEAD ACTUATOR WITH PIVOT HINGE AND HALBACH MAGNET ARRAY

CROSS-REFERENCE TO RELATED PATENT APPLICATION

This application claims the benefit of Korean Patent Application Nos. 10-2004-0103074, filed on Dec. 8, 2004 and 10-2005-0074440, filed on Aug. 12, 2005, in the Korean Intellectual Property Office, the disclosures of which are incorporated herein in their entirety by reference.

BACKGROUND OF THE INVENTION

1. Field of the Invention

The present invention relates to an optical/magnetic head actuator, and more particularly, to an ultra-small optical/magnetic head actuator.

2. Description of the Related Art

As information technology grows, data storage devices are being produced with higher densities, and thus have large capacities while small in size. While flash memories have advantages of mobility, durability, and rewritablity, they are relatively expensive and have limited density because of limitations in semiconductor processing. Accordingly, optical/magnetic data storage devices using optical media such as compact disks (CDs) or digital versatile disks (DVDs) or magnetic media such as hard disks are still widely used.

Optical/magnetic data storage devices include an optical/magnetic head for reading or writing information on an optical or magnetic medium, and an optical/magnetic head actuator for driving the optical/magnetic head. An optical head actuator is disclosed in U.S. Pat. No. 6,768,601, entitled "A Position Control Unit for a Lens of an Optical Pickup Device", issued Jul. 27, 2004, invented by Chae Min Ju, and assigned to LG electronics. This invention controls the position of a lens in a focusing direction and a tracking direction using six wires. However, the invention uses general-purpose magnets for operation in the focusing direction, thereby resulting in an increase in thickness. Accordingly, it is not suitable for an ultra-small optical head actuator for driving an ultra-small optical pickup device.

A magnetic head actuator is disclosed in U.S. Patent Publication No. 2003/0044096, entitled "A Pivot Bearing for a Swing Arm of a Hard Disk Driver", published on Mar. 6, 2003, invented by Toshisada Koyama, Yasuhiro Mouri, assigned to Minebea Kabushiki-kaisha. This invention uses a pivot bearing to move a swing arm in a tracking direction. However, when the pivot bearing is used to rotate the swing arm, friction or backlash and non-repetitive errors occur due to a bearing clearance.

SUMMARY OF THE INVENTION

The present invention provides a thin ultra-small optical/magnetic head actuator without friction, backlash, and non-repetitive errors.

According to an aspect of the present invention, there is provided an ultra-small optical/magnetic head actuator comprising: a swing arm movable in a horizontal direction (tracking direction) and a vertical direction (focusing direction) and having mounted thereon a head for reading and writing information on a disk; and a tracking actuator moving the swing arm in the horizontal direction (tracking direction) for the disk. The tracking actuator may be a voice coil motor.

The ultra-small optical/magnetic head actuator also comprises: a pivot hinge adjusting a radius of rotation of the swing arm and guiding the movement of the swing arm in the tracking direction; and a focusing actuator moving the swing arm in the vertical direction (focusing direction) for the disk. The pivot hinge may include two flexible hinges intersecting each other.

The focusing actuator includes a focusing coil attached under the swing arm and a Halbach magnet array disposed under the focusing coil to minimize thickness. The Halbach magnet array may form an arc disposed along a direction in which the swing arm rotates. The Halbach magnet array may include magnets magnetized in a horizontal direction that moves the swing arm in the vertical direction according to Fleming's Left Hand Rule.

Since the ultra-small optical/magnetic head actuator guides the swing arm to rotate using the pivot hinge with the two intersecting flexible hinges, friction and backlash can be prevented and non-repetitive errors can be reduced relative to when the swing arm is guided to rotate by a conventional bearing. Furthermore, since the ultra-small optical/magnetic head actuator uses the Halbach magnet array in the focusing actuator, the thickness of an ultra-small storage device can be reduced dramatically.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENT

The present invention will now be described more fully with reference to the accompanying drawings, in which preferred embodiments of the invention are shown. This invention may, however, be embodied in many different forms and should not be construed as being limited to the embodiments set forth herein. Rather, these embodiments are provided so that this disclosure will be thorough and complete and will fully convey the scope of the invention to those skilled in the art. In the drawings, the forms of some elements are exaggerated in the figures for clarity. Like reference numerals throughout the drawings denote like elements.

Figure 1:
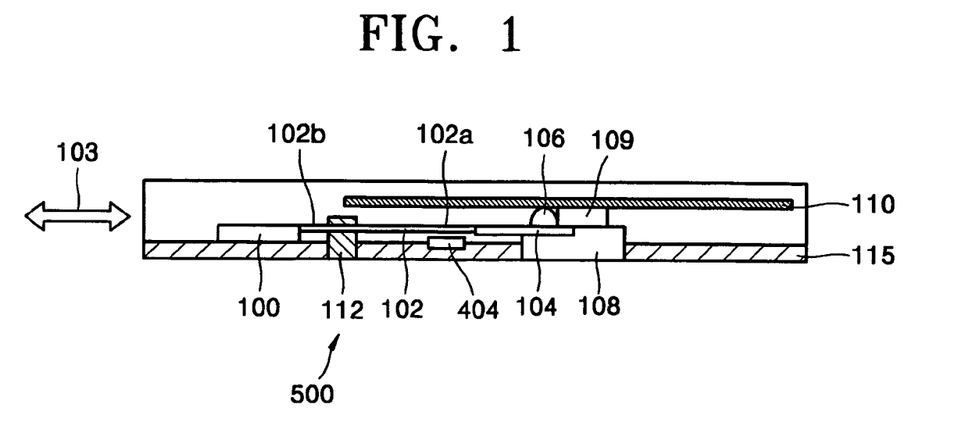
FIGS. 1 and 2 are respectively a front view and a plan view of an ultra-small storage device including an ultra-small optical/magnetic head actuator according to an embodiment of the present invention.
Figure 2:
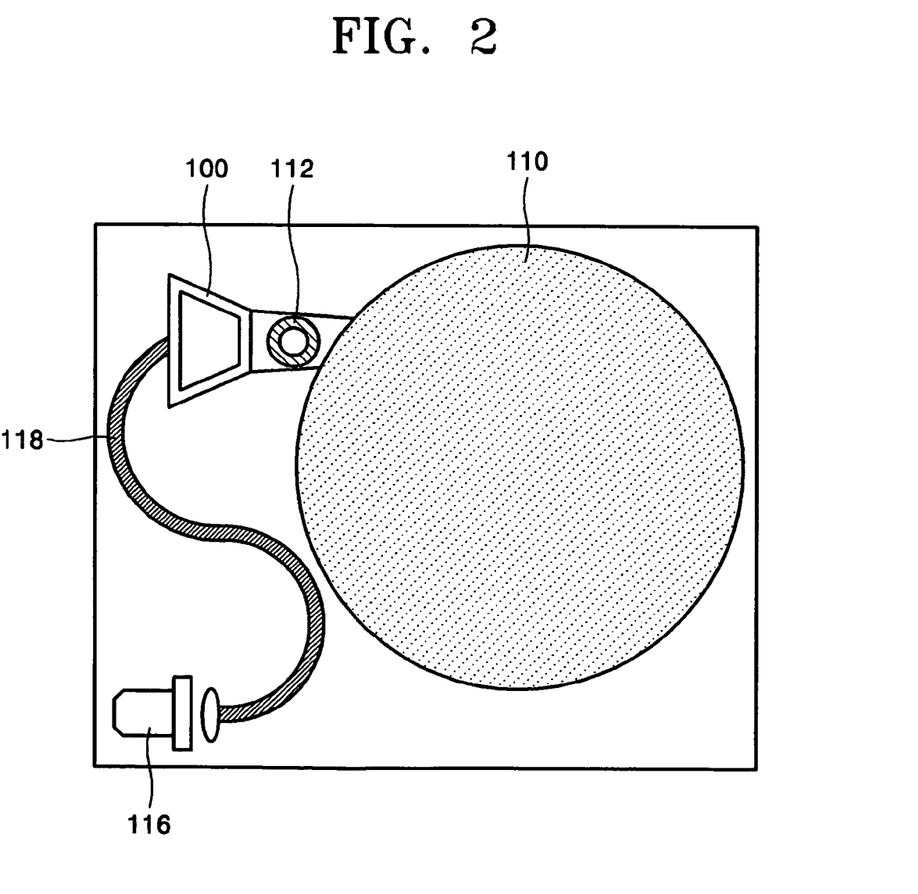

FIGS. 1 and 2 are respectively a front view and a plan view of an ultra-small storage device including an ultra-small optical/magnetic head actuator according to an embodiment of the present invention. In order to better understand the construction and operation of an ultra-small optical/magnetic head actuator but to simplify the description, FIGS. 1 and 2 show an ultra-small optical head actuator. The structure and operation of an ultra-small magnetic head actuator, not shown in the figures, is the same as the structure and operation of the ultra-small optical head actuator shown in FIGS. 1 and 2 except that a magnetic head is used instead of an optical head and a magnetic medium (magnetic disk) is used instead of an optical medium. For purposes of this disclosure, an ultra-small storage device including the ultra-small optical/magnetic head actuator is considered to be one that is less than or equal to 43 mm wide, 36 mm long, and 5 mm high.

As can be seen in FIG. 1, the optical/magnetic head actuator 500 of the ultra-small storage device includes a swing arm 102 on which a lens 106 and a head 104, e.g., an optical head, for reading and writing information on a disk 110 are mounted. The head 104 and the lens 106 are mounted on a front or distal end 102A of the swing arm 102. The disk 110 is disposed over the lens 106 such that the disk 110 can be rotated by a spindle motor 108 and a motor shaft 109.

A voice coil motor 100, which is considered to be a tracking actuator 100, is disposed on a rear end 102B of the swing arm 102 to move the swing arm 102 in a horizontal direction 103 (tracking direction) relative to the disk 110. A pivot hinge 112 is disposed between the tracking actuator 100 and the head 104 to adjust the radius of rotation and guide the swing arm 102 to move in the tracking direction. The structures of the tracking actuator 100 and the pivot hinge 112 will be explained in detail later.

Figure 3:
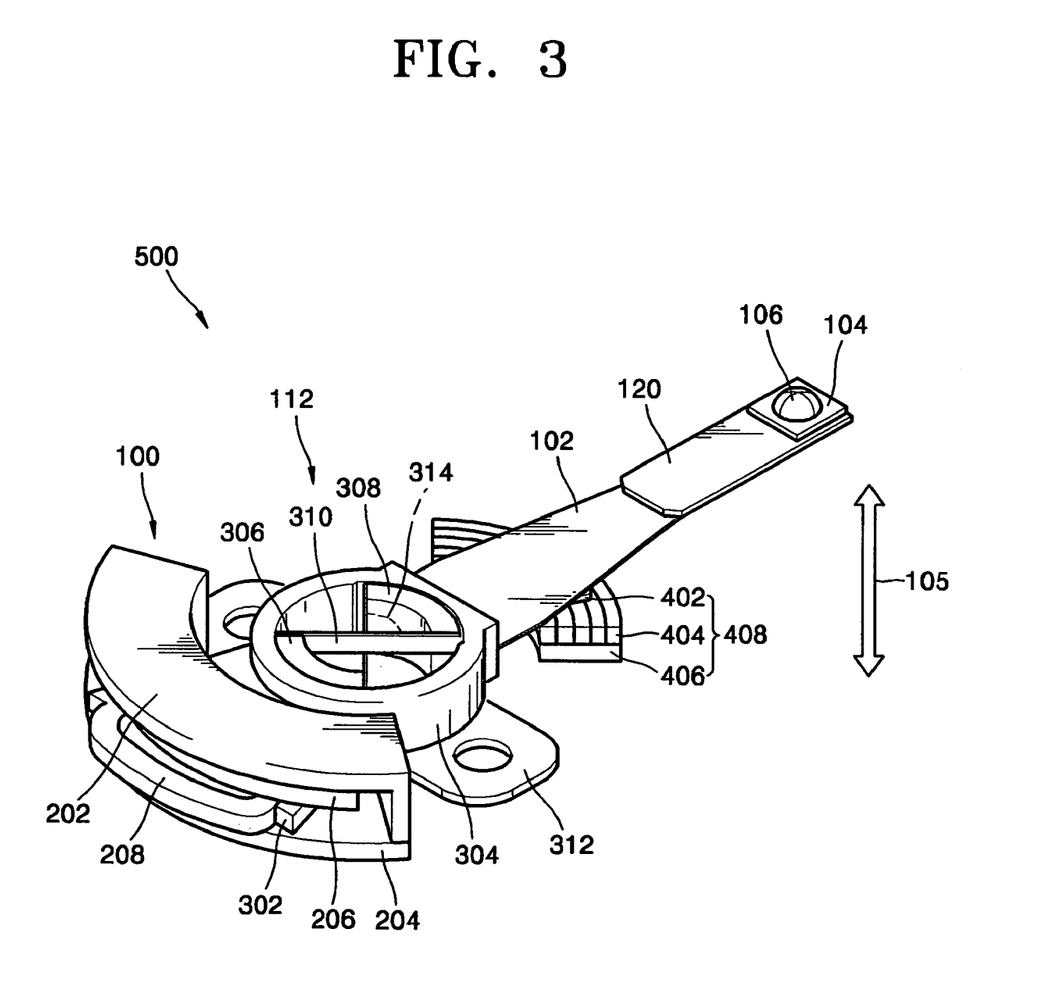
FIGS. 3 and 4 are respectively a perspective view and an exploded view of the ultra-small optical/magnetic head actuator of FIGS. 1 and 2.

As can be seen in FIG. 3, the optical/magnetic head actuator 500 of the ultra-small storage device includes a focusing actuator 408, which can move the swing arm 102 in a vertical direction 105 (focusing direction) below the disk 110. The focusing actuator 408 includes a focusing coil 402 (see FIG. 3) and a Halbach magnet array 404. The focusing coil 402 is attached under the swing arm 102 as will be described later, and the Halbach magnet array 404 is at the bottom of a deck along the focusing coil 402. The focusing coil 402 and the Halbach magnet array 404 will be explained later. The focusing actuator 408 exerts a force according to Fleming's Left Hand Rule to move the swing arm 102 in the vertical direction 105. The ultra small storage device includes a printed circuit board (PCB) substrate 115 as a base, as shown in FIG. 1. A laser diode 116 is connected to the tracking actuator by an optical fiber 118, as shown in FIG. 2.

Figure 4:
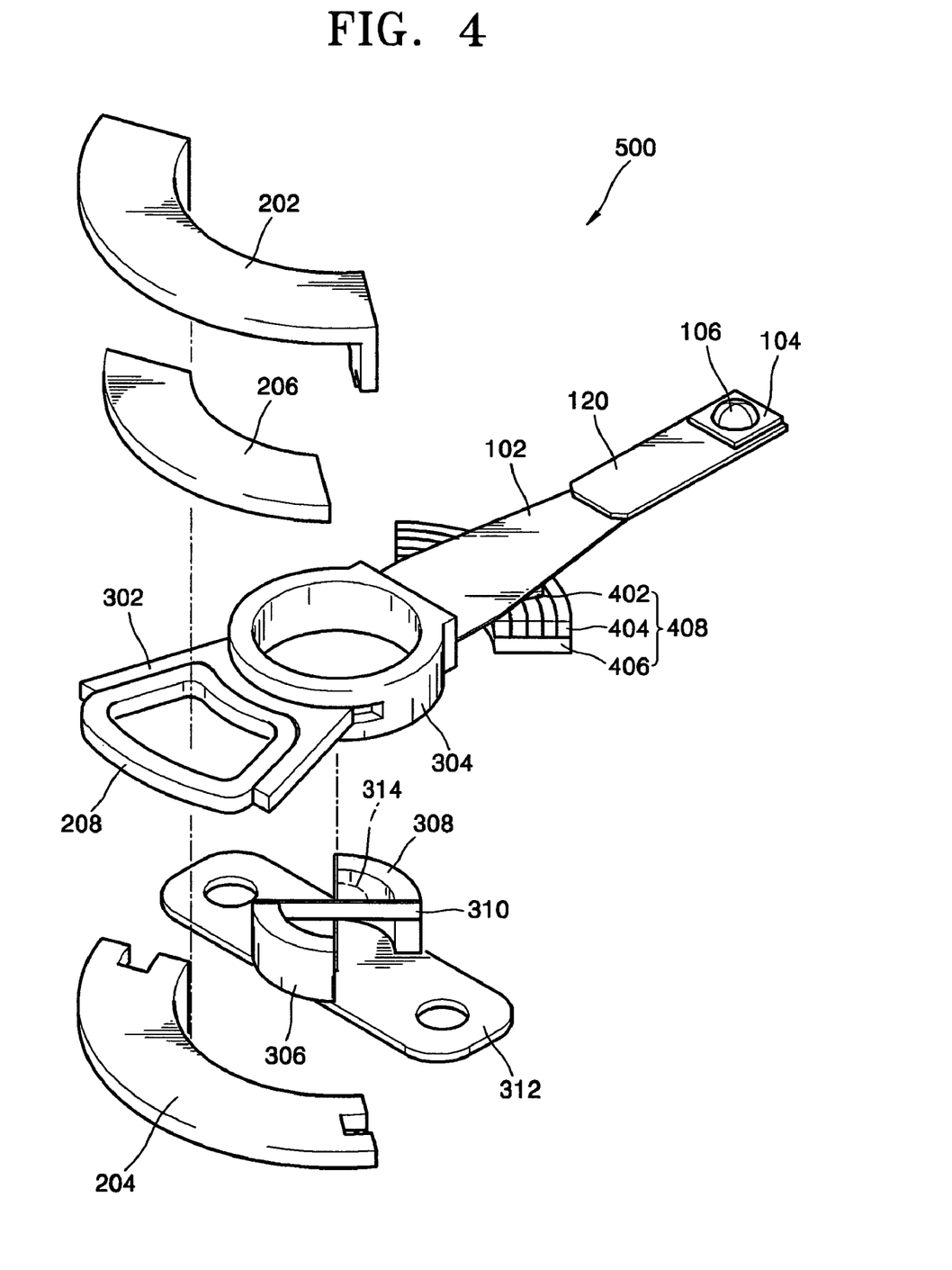

FIGS. 3 and 4 are respectively a perspective view and an exploded view of the ultra-small optical/magnetic head actuator of FIGS. 1 and 2.

The optical/magnetic head actuator 500 of the ultra-small storage device includes the tracking actuator 100, which can move the swing arm 102 in the horizontal direction 103 (tracking direction) as described above. The voice coil motor, which embodies the tracking actuator 100 includes an upper yoke 202, a lower yoke 204, a permanent magnet 206 disposed between the upper yoke 202 and the lower yoke 204, and a voice coil 208.

The permanent magnet 206 crosses the voice coil 208, which is attached under the upper yoke 202 and forms an arc. A driving force F for driving the tracking actuator 100 is given by $$F = BILN \qquad (1)$$

where B is the magnetic flux density, I is the current flowing through the voice coil 208, L is the length of a conductor, and N is the number of turns of the voice coil 208. The direction in which the tracking actuator 100 is moved satisfies Fleming's Left Hand Rule.

The tracking actuator 100 is connected to the pivot hinge 112, which adjusts the radius of rotation of the swing arm 102. The pivot hinge 112 includes a protruding support unit 302 connected to the outer surface of the voice coil 208 to support the voice coil 208, a circular rotation guiding unit 304 connected to the protruding support unit 302, first and second rotators 306 and 308 inserted into the rotation guiding unit 304 to be spaced apart from each other, two flexible hinges 310 installed between the first and second rotators 306 and 308 to intersect each other, and a base support unit 312 supporting the first and second rotators 306 and 308 and the rotation guiding unit 304. The flexible hinges 310 are made of steel plates. The two flexible hinges 310 intersect each other, and an angle of intersection 314 made by the flexible hinges 310 may be 90 degrees or another angle.

While the first rotator 306 and the rotation guiding unit 304 are adhered to each other, the second rotator 308 is separated from the rotation guiding unit 304 by a predetermined gap. The first rotator 306 and the rotation guide unit 304 are adhered by an epoxy adhesive. As a result, the voice coil 208 of the tracking actuator 100 and the protruding support unit 302 connected to the voice coil 208 are moved in the tracking direction, the second rotator 308 of the pivot hinge 112 is rotated in the tracking direction, and thus the swing arm 102 is moved in the tracking direction.

The movement of the swing arm 102 will now be explained in detail. As described above, the tracking actuator 100 includes the permanent magnet 206 and the voice coil 208. When current flows through the voice coil 208, a force is generated in a direction perpendicular to the current and the flux distribution of the voice coil 208 according to Fleming's Left Hand Rule. The force causes the swing arm 102 to move in the tracking direction. The voice coil 208 is attached to the protruding support unit 302, and the force generated by the voice coil 208 is transmitted through the protruding support unit 302 to the swing arm 102.

Figure 5:
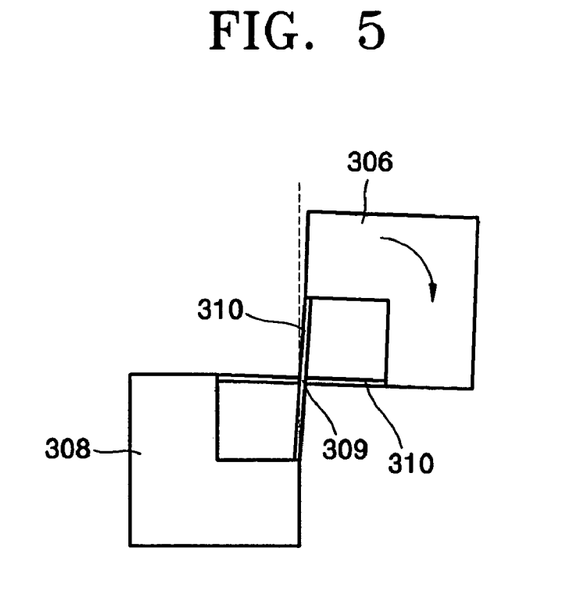
FIGS. 5 and 6 respectively illustrate the center of rotation of a pivot hinge and a stress distribution of the pivot hinge according to load.
Figure 6:
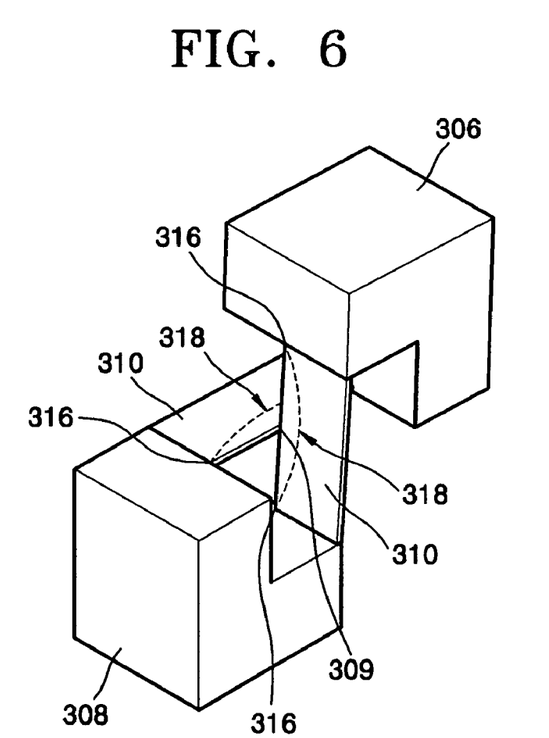

The pivot hinge 112 adjusts the radius of rotation of the swing arm 102 when the swing arm 102 is moved in the tracking direction. The center of rotation of the swing arm 102 when the swing arm 102 is rotated in the tracking direction using the pivot hinge 112 coincides with the center of the flexible hinges 310. That is, the pivot hinge 112 is the center of rotation of the swing arm 102 when the swing arm 102 rotates in the tracking direction. More precisely, the two flexible hinges 310 inserted into the pivot hinge 112 intersect each other as shown in FIG. 6. A point of intersection between the two flexible hinges 310 is the center of rotation of the swing arm 102, as shown in FIG. 5.

In particular, since the intersecting flexible hinges 310 of the pivot hinge 112 guide the swing arm 102 to move in the tracking direction, friction and backlash can be avoided and non-repetitive errors can be reduced relative to when the rotation of the swing arm 102 is guided by a conventional bearing. Furthermore, the pivot hinge 112 can minimize a translation movement occurring during rotation, and increase stiffness in a reverse direction.

In other words, the point of intersection between the two flexible hinges 310 is the axis of rotation of the swing arm 102, such that the two flexible hinges 310 can act as the conventional bearing. The flexible hinges 310 bend like springs due to the force generated by the permanent magnet 206 and the voice coil 208 to rotate the swing arm 102. That is, the flexible hinges 310 guide the swing arm 102 so that the swing arm 102 can rotate. When the force in the rotational direction is removed, the flexible hinges 310 are returned to their original position due to a restoring force. Although one flexible hinge can guide the rotation of the swing arm 102, the two flexible hinges 310 are used in the present embodiment to minimize a distortion of the axis of rotation during the rotation of the swing arm 206.

The swing arm 102 is connected to the pivot hinge 112, and the head 104 and the lens 106 are mounted on the front end of the swing arm 112. The focusing actuator 408 is disposed under the swing arm 102 to move the swing arm 102 in the vertical direction (focusing direction) below the disk 110.

The focusing actuator 408 includes the focusing coil 402 and the Halbach magnet array 404. The use of the focusing actuator 408 can reduce the thickness of the ultra-small storage device using the Halbach magnet array 404. The yoke 406 may or may not be installed under the Halbach magnet array 404 because it increases the thickness of the ultra-small optical/magnetic head actuator.

The focusing coil 402 is attached under the swing arm 102, and the Halbach magnet array 404 forms an arc about the center of rotation in the tracking direction. In other words, the focusing coil 402 is attached under the swing arm 102 and the Halbach magnet array 404 is disposed under the swing arm 102 and forms an arc along a direction in which the focusing coil 402 moves. The focusing actuator 408 exerts a force according to Fleming's Left Hand Rule. The focusing actuator 408 will be explained later in detail. A lens holder 120 supports the lens 106 and the head 104 on the arm 102.

FIGS. 5 and 6 respectively illustrate the center of rotation of the pivot hinge 112 and a stress distribution in the pivot hinge 112 according to load.

In detail, FIG. 5 illustrates the results of a computer analysis performed to verify that the center of rotation of the pivot hinge 112 is the point of intersection between the two flexible hinges 310. FIG. 6 illustrates the results of FIG. 5 in three dimensions.

A portion in the lower left quadrant in FIG. 5 corresponds to the second rotator 308 of FIG. 4, and a portion in the upper right quadrangle in FIG. 5 corresponds to the first rotator 306 of FIG. 4. Intersecting flexible hinges connecting the two quadrant correspond to the flexible hinges 310 of FIG. 4. When the swing arm 102 is forced to rotate and thus the first rotator 306 is forced to rotate, the flexible hinges 310 guide the swing arm 102 to rotate.

It can be seen from FIGS. 5 and 6 that the center of rotation 309, i.e., the axis of rotation 309 is the point of intersection between the two steel plates 310 that form flexible hinges. Further, since the two steel plates 310 forming the flexible hinges 310 intersect each other as shown in FIG. 5, the center of rotation 309 is formed around the point of intersection between the two steel plates 310, such that the radius of rotation is smaller than when a hinge made of one steel plate is used.

Since the intersecting flexible plates/hinges 310 experience restoring force when they are forced to rotate, stress is generated. The dotted line in FIGS. 5 and 6 illustrating a boundary line of the stress distribution. The thickness and size of the flexible hinges 310 are determined in the design stage based on the stress distribution. In the preferred embodiment, the length, width and thickness of the steel plates/flexible hinges were 7 mm., 2 mm. and 0.1 mm. respectively. Referring to FIG. 6, while a maximum stress is generated at an end portion 316 of a steel plate when the hinge is made of one steel plate, a maximum stress is generated at a central portion 318 of the two steel plates when the hinges are made of the two intersecting steel plates, thereby reducing the radius of rotation.

Figure 7:
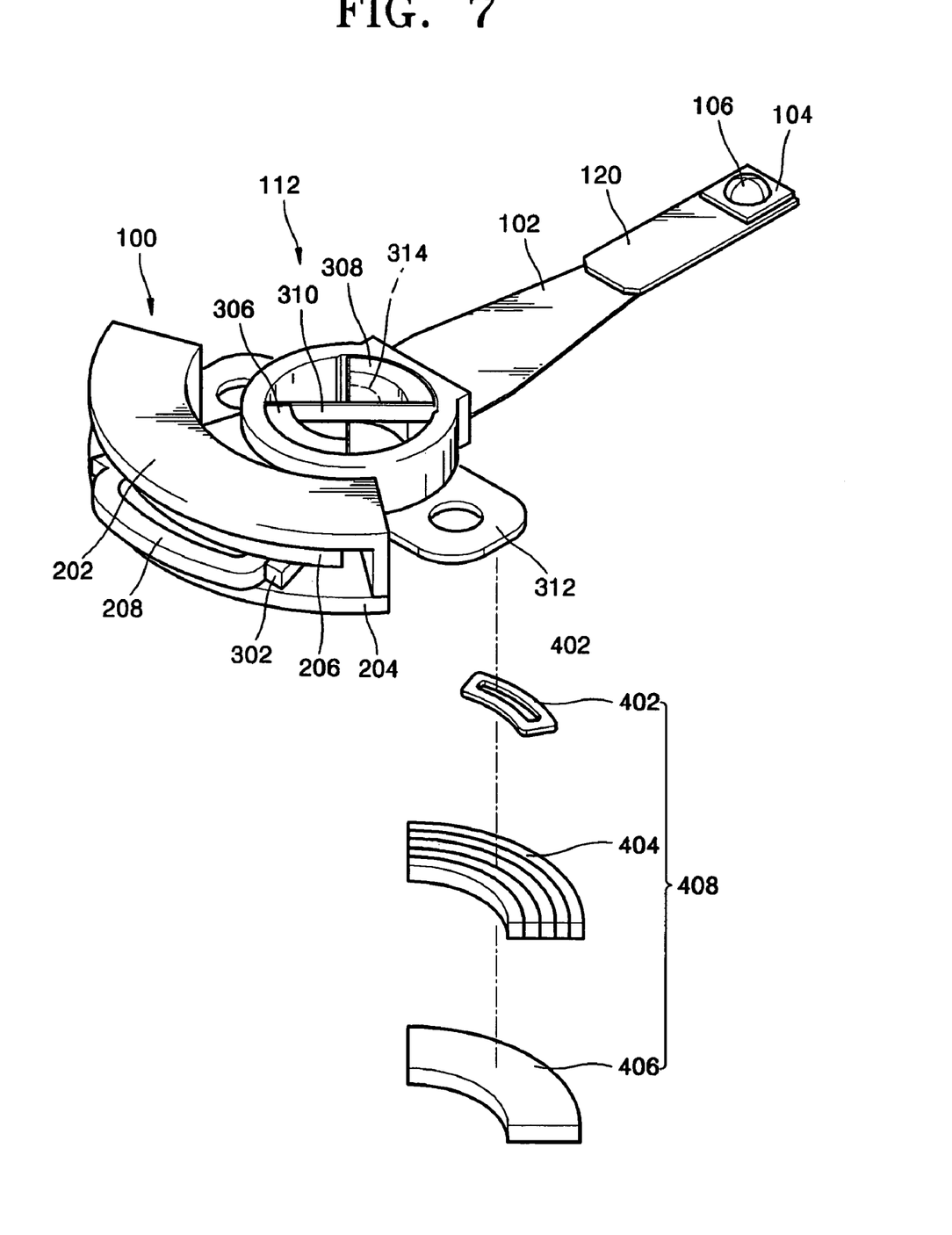
FIG. 7 is an exploded view of a focusing actuator of the ultra-small optical/magnetic head actuator of FIGS. 3 and 4.
Figure 8:
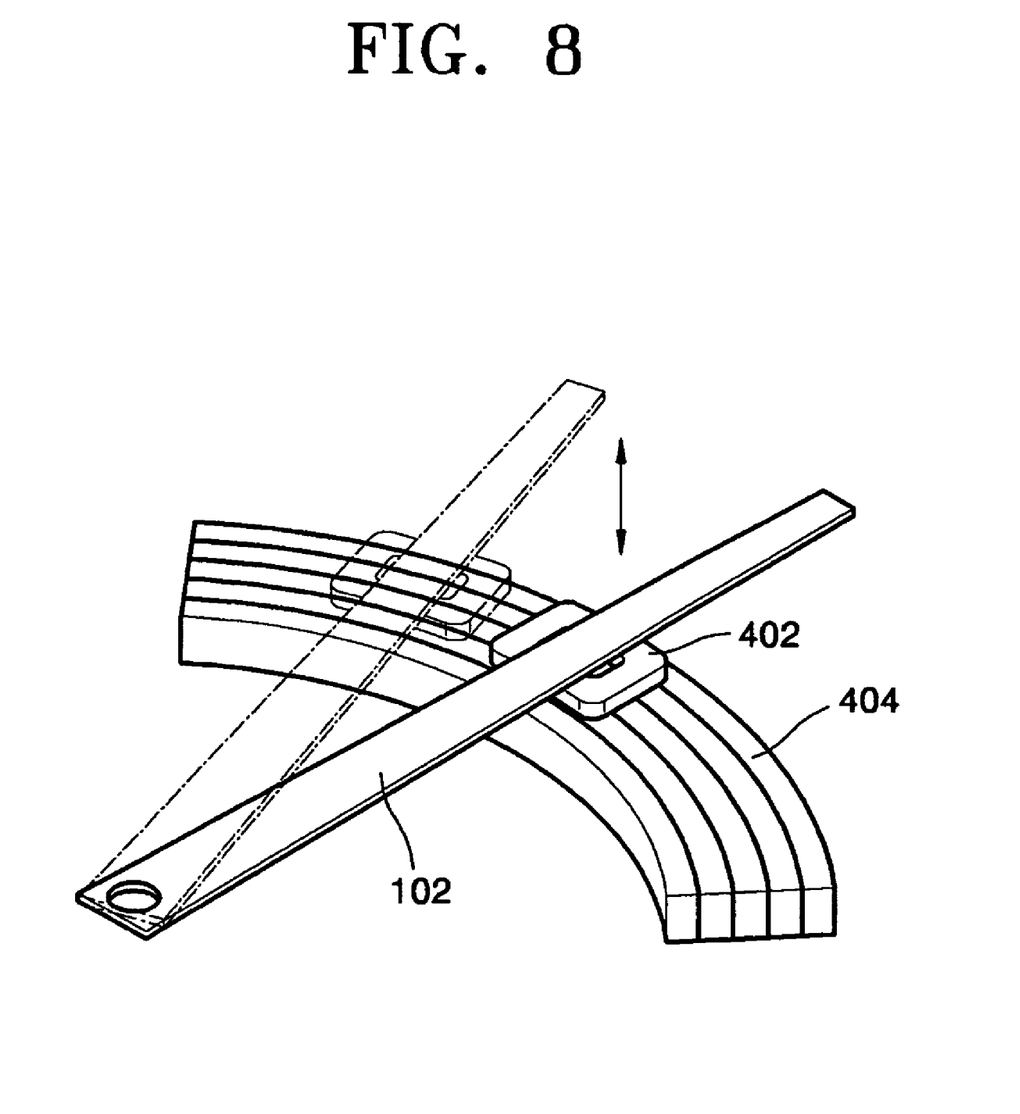
FIG. 8 is a perspective view illustrating a state where a swing arm is moved by the focusing actuator of FIG. 7.

FIG. 7 is an exploded view of a preferred embodiment of a focusing actuator 408 of the ultra-small optical/magnetic head actuator of FIGS. 3 and 4. FIG. 8 is a diagram for explaining how the focusing actuator 408 of FIG. 7 is moved.

As shown in FIG. 7, the focusing coil 402 of the focusing actuator 408 moves in the vertical or focusing direction 105 due to a magnetic force generated by the Halbach magnet array 404 mounted under the swing arm 102. The Halbach magnet array 404 forms an arc along the direction in which the swing arm 102 rotates, as shown in FIG. 8. The Halbach magnet array 404 ensures a constant magnetic flux in the vertical direction even when the swing arm 102 rotates.

Figure 9:
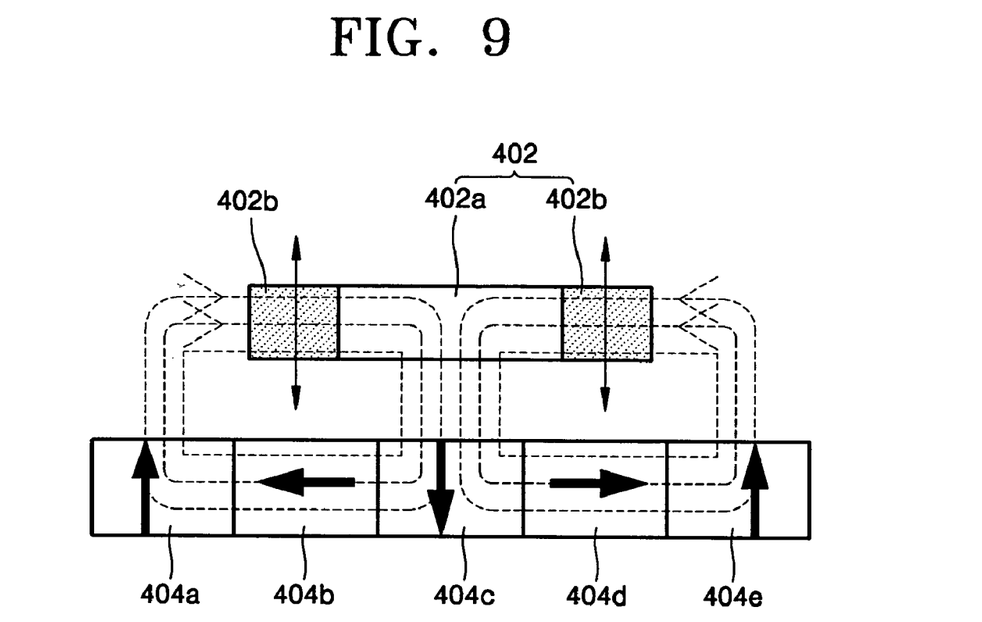
FIGS. 9 and 10 are respectively a cross-sectional view and a perspective view of a Halbach magnet array of the focusing actuator of FIG. 7.
Figure 10:
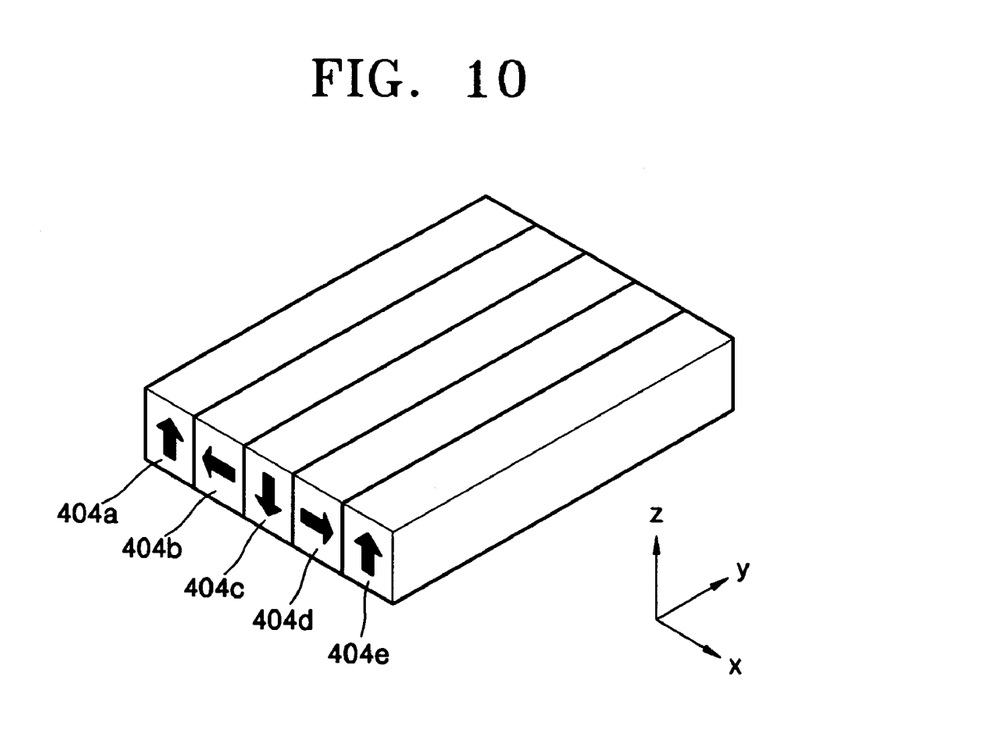

FIGS. 9 and 10 are respectively a cross-sectional view and a perspective view of the Halbach magnet array 404 of the focusing actuator 408.

Referring to FIGS. 9 and 10, the Halbach magnet array 404 is a magnet assembly in which a first magnet 404a, a second magnet 404b, a third magnet 404c, a fourth magnet 404d, and a fifth magnet 404e are assembled in parallel in an X direction. The magnet assembly may be formed of an Nd—Fe—B alloy. The size of the magnet assembly may be varied. In the present embodiment, the height of the magnet assembly in a Z direction of FIG. 10 is 2 mm, the width of the first magnet 404a and the second magnet 404b is 1 mm, the width of the third magnet 404c is 2 mm, the width of the fourth magnet 404d is 1 mm, and the width of the fifth magnet 404e is 2 mm in a X direction of FIG. 10. The Halbach magnet array 404 is explained in greater detail below.

The first magnet 404a and the fifth magnet 404e are magnetized in the vertical direction 103 (z direction) with the N-pole pointing up, the second magnet 404b is magnetized in the horizontal direction 105 (x direction) with the N-pole pointing left, the third magnet 404c is magnetized in the vertical direction 103 with the N-pole pointing down, and the fourth magnet 404d is magnetized in the horizontal direction 105 with the N-pole pointing right.

In particular, when the Halbach magnet array 404 is used, the magnetic flux indicated by the dotted line in FIG. 9 is enhanced above the Halbach magnet array 404, and cancels out below the Halbach magnet array 404. Accordingly, the focusing coil 402, which is composed of a body 402a and a coil 402b, is moved vertically due to the second magnet 404b and the fourth magnet 404d magnetized in the horizontal direction.

Figure 11:
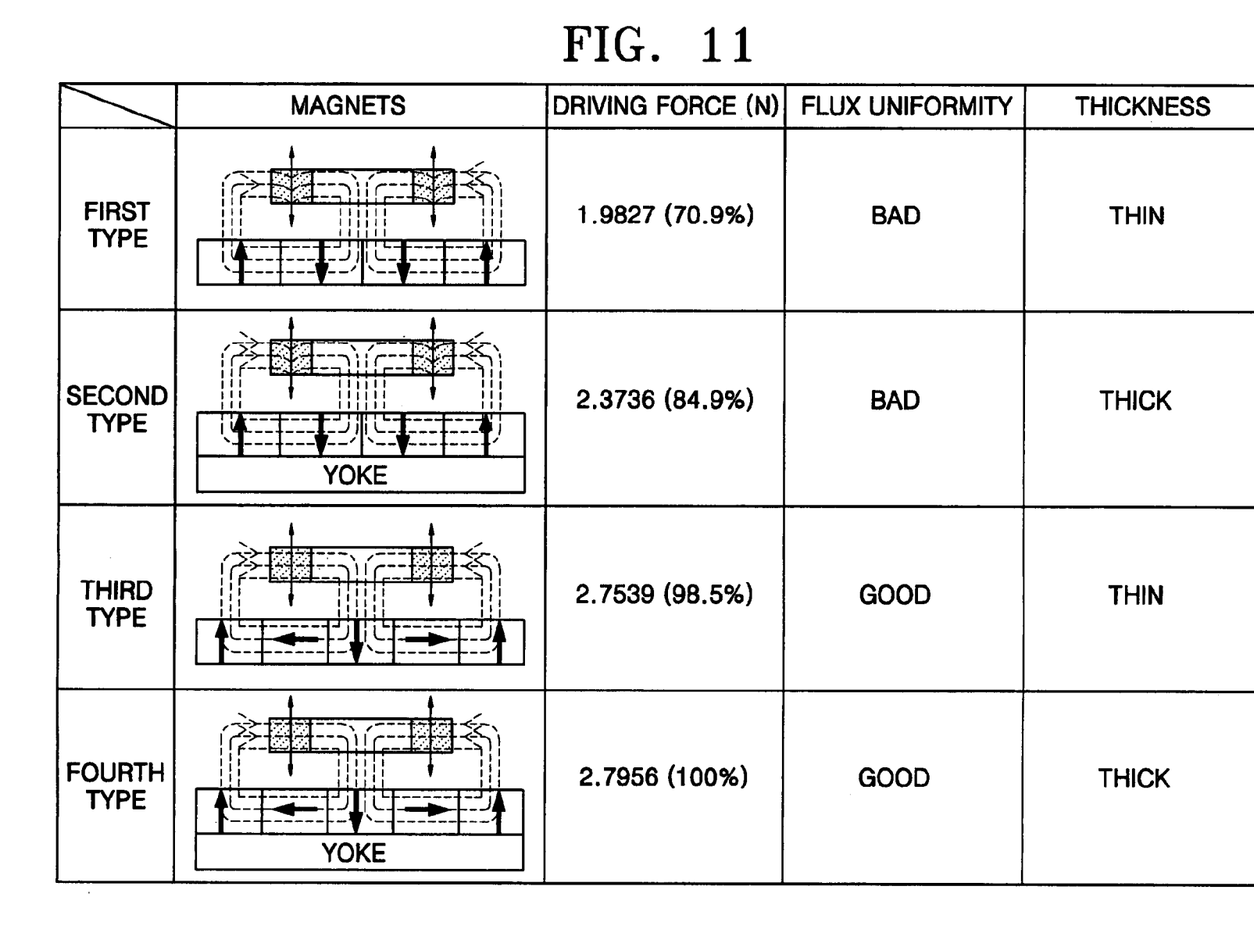
FIG. 11 is a table for explaining various types of Halbach magnet arrays that can be used in a focusing actuator.

FIG. 11 is a table that explains various types of Halbach magnet arrays made of a Nd—Fe—B alloy that can be used in a focusing actuator.

Two types of magnets listed in the table can be used as the Halbach magnet array 404 of the present embodiment. First and second types of Halbach magnet arrays are general magnet assemblies with four magnets, and third and fourth types are magnet assemblies with five magnets as shown in FIG. 9. The first and third types of Halbach magnet arrays do not use any yoke thereunder, and the second and fourth types use a yoke thereunder. The third and fourth types of Halbach magnet arrays include magnets magnetized in both horizontal and vertical directions, and the first and second types include only magnets magnetized in a vertical direction. Magnetic flux is indicated by a dotted line. A focusing coil is installed over the magnets.

Referring to FIG. 11, driving forces for driving the focusing coil are higher in the third and fourth types of Halbach magnet arrays. Parenthesized values are relative values based on the driving force of the fourth type of Halbach magnet array being 100%. As shown in FIG. 11, the third and fourth types of Halbach magnet arrays have good flux uniformity, and the first and third types of Halbach magnet arrays are relatively thin. Considering the driving force, the magnetic flux uniformity, and thickness, the third type of Halbach magnet array is considered to be optimum or best, and the fourth type of Halbach magnet array may be used, if necessary.

Figure 12:
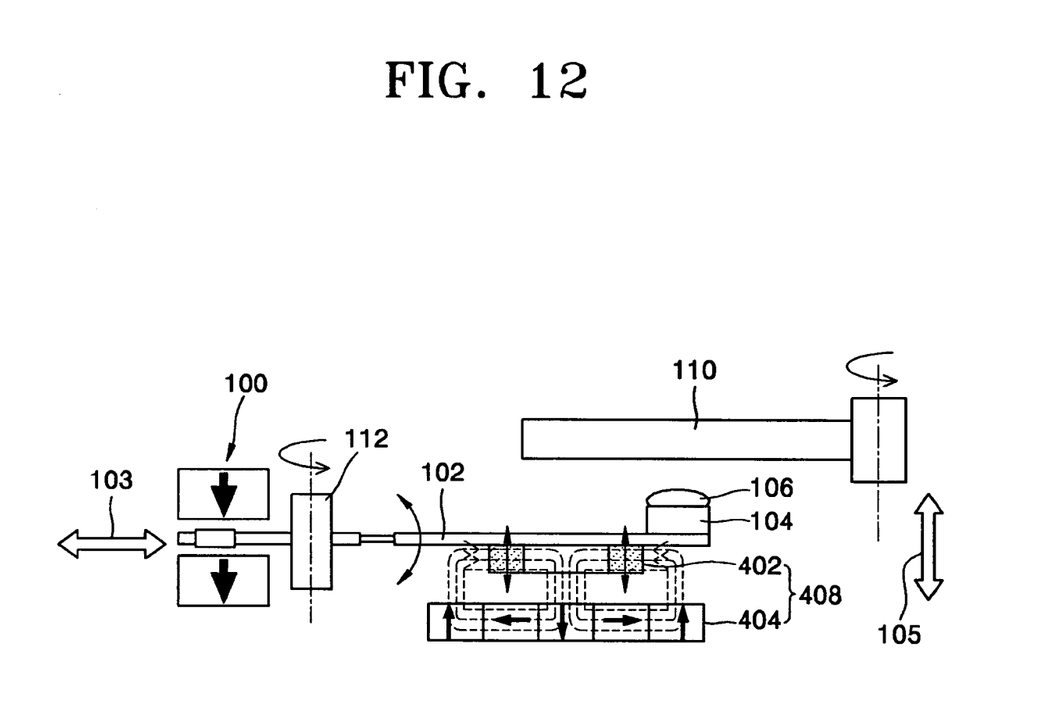
FIG. 12 is a diagram for explaining the operation of the optical/magnetic head actuator of FIG. 1.

FIG. 12 is a diagram for explaining the operation of the optical/magnetic head actuator of FIG. 1 in greater detail.

The optical/magnetic head actuator moves the swing arm 102 in the horizontal direction 103 (tracking direction) of the rotating disk 110 using the tracking actuator 100. When the swing arm 102 moves in the horizontal direction 103, the pivot hinge 112 is the axis of rotation of the tracking actuator 100. Magnetizations of the upper and lower yokes in the tracking actuator 100 are indicated by arrows.

The focusing actuator 408 moves the swing arm 102 in the vertical direction (focusing direction) below the disk 110. The focusing actuator 408 includes the focusing coil 402 and the Halbach magnet array 404 as described above. The focusing coil 402 is attached under the swing arm 102, and the Halbach magnet array 404 is disposed under the focusing coil 402. The focusing coil 402 moves the swing arm 102 in the focusing direction using a vertical driving force generated by the magnets magnetized in the horizontal direction As described above, the ultra-small optical/magnetic head actuator includes the pivot hinge 112, which adjusts the radius of rotation of the tracking actuator 100 for moving the swing arm 102 in the horizontal direction (tracking direction) of the disk 110 and guides the rotation of the swing arm 102 in the tracking direction. Since the two flexible hinges 310 of the pivot hinge 112 guide the swing arm 102 to rotate, friction or backlash can be avoided and non-repetitive errors can be reduced relative to when the conventional bearing is used.

Moreover, the ultra-small optical/magnetic head actuator includes the Halbach magnet array 404 of the focusing actuator 408 which can move the swing arm 102 in the vertical direction (focusing direction) below the disk 110. Accordingly, the thickness of the ultra-small storage device can be reduced dramatically.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An ultra-small head actuator comprising:
a swing arm movable in a horizontal direction (tracking direction) and a vertical direction (focusing direction) and having mounted thereon a head for reading and writing information on a disk;
a tracking actuator moving the swing arm in the horizontal direction (tracking direction) for the disk;
a pivot hinge adjusting a radius of rotation of the swing arm and guiding the movement of the swing arm in the tracking direction; and
a focusing actuator moving the swing arm in the vertical direction (focusing direction) for the disk,
wherein the focusing actuator includes a focusing coil attached under the swing arm and a Halbach magnet array disposed under the focusing coil to minimize thickness.

2. The ultra-small head actuator of claim 1, wherein the tracking actuator is a voice coil motor.

3. The ultra-small head actuator of claim 1, wherein the pivot hinge includes two flexible hinges intersecting each other.

4. The ultra-small head actuator of claim 3, wherein the center of rotation of the pivot hinge coincides with a point of intersection of the two flexible hinges.

5. The ultra-small head actuator of claim 1, wherein the pivot hinge includes two flexible hinges intersecting each other at 90 degrees.

6. The ultra-small head actuator of claim 1, wherein the Halbach magnet array forms an arc along a direction in which the swing arm rotates.

7. The ultra-small head actuator of claim 1, wherein the Halbach magnet array is a magnet assembly in which first through fifth magnets are assembled horizontally,
wherein the first magnet and the fifth magnet are magnetized in the vertical direction with the N-poles pointing up, the second magnet is magnetized in the horizontal direction with the N-pole pointing left, the third magnet is magnetized in the vertical direction with the N-pole pointing down, and the fourth magnet is magnetized in the horizontal direction with the N-pole pointing right.

8. The ultra-small head actuator of claim 1, wherein the focusing coil further includes a yoke installed under the Halbach magnet array.

9. The ultra-small head actuator of claim 1, wherein the Halbach magnet array includes magnets magnetized in a horizontal direction such that the Halbach magnet array can move the swing arm in the vertical direction according to Fleming's Left Hand Rule.

10. The ultra-small head actuator of claim 1 wherein the ultra-small head actuator is an optical head actuator.

11. The ultra-small head actuator of claim 1 wherein the ultra-small head actuator is a magnetic head actuator.

12. An ultra-small optical/magnetic head actuator comprising:
a swing arm movable in a horizontal direction (tracking direction) and a vertical direction (focusing direction) and having mounted thereon a head for reading and writing information on a disk;
a tracking actuator that is installed on an end of the swing arm and moving the swing arm in the horizontal direction (tracking direction), and includes a voice coil motor consisting of an upper yoke, a lower yoke, a magnet disposed between the upper yoke and the lower yoke, and a voice coil;
a pivot hinge including a protruding support unit connected to the voice coil of the tracking actuator, a circular rotation guiding unit connected to the protruding support unit, first and second rotators inserted into the rotation guiding unit to be spaced apart from each other, two flexible hinges installed between the first and second rotators to intersect each other, and a base support unit supporting the first and second rotators and the rotation guiding unit, the pivot hinge guiding the rotation of the swing arm and adjusting a radius of rotation of the swing arm; and
a focusing actuator including a focusing coil attached under the swing arm and a Halbach magnet array disposed under the focusing coil to move the swing arm in the vertical direction (focusing direction).

13. The ultra-small optical/magnetic head actuator of claim 12, wherein the magnet of the tracking actuator is attached under the upper yoke, and the voice coil forms an arc and is attached to the protruding support unit.

14. The ultra-small optical/magnetic head actuator of claim 13, wherein the magnet of the tracking actuator is attached under the upper yoke to cross the voice coil.

15. The ultra-small optical/magnetic head actuator of claim 12, wherein the first rotator of the pivot hinge is attached to the rotation guiding unit and the second rotator of the pivot hinge is spaced apart from the rotation guiding unit such that when the protruding support unit is moved in the tracking direction, the swing arm is moved in the tracking direction.

16. The ultra-small optical/magnetic head actuator of claim 12, wherein the center of rotation of the pivot hinge coincides with a point of intersection of the two flexible hinges.

17. The ultra-small optical/magnetic head actuator of claim 12, wherein the flexible hinges of the pivot hinge intersect each other at 90 degrees.

18. The ultra-small optical/magnetic head actuator of claim 12, wherein the Halbach magnet array has an arc shape extending along a direction in which the swing arm rotates.

19. The ultra-small optical/magnetic head actuator of claim 12, wherein the Halbach magnet array is a magnet assembly in which first through fifth magnets are assembled in parallel,
wherein the first and fifth magnets are magnetized in the vertical direction with the N-pole pointing up, the second magnet is magnetized in the horizontal direction with the N-pole pointing left, the third magnet is magnetized in the vertical direction with the N-pole pointing down, and the fourth magnet is magnetized in the horizontal direction with the N-pole pointing right.

20. The ultra-small optical/magnetic head actuator of claim 12, wherein the focusing actuator further includes a yoke installed under the Halbach magnet array.

21. The ultra-small optical/magnetic head actuator of claim 12, wherein the Halbach magnet array includes magnets magnetized in a horizontal direction and moving the swing arm in the vertical direction according to Fleming's Left Hand Rule.

\* \* \* \* \*